June 2, 1936. F. N. ROSS ET AL 2,043,064
SEWING LOOPER MECHANISM
Filed Oct. 20, 1930 13 Sheets-Sheet 6
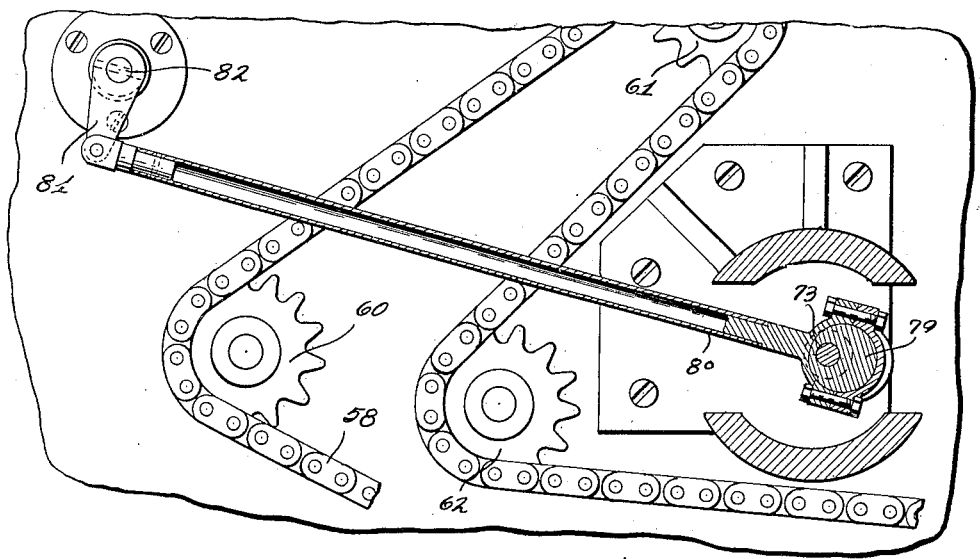
Fig. 7.
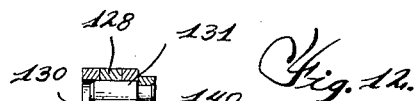
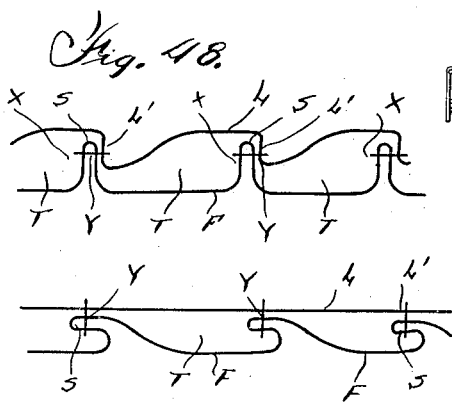
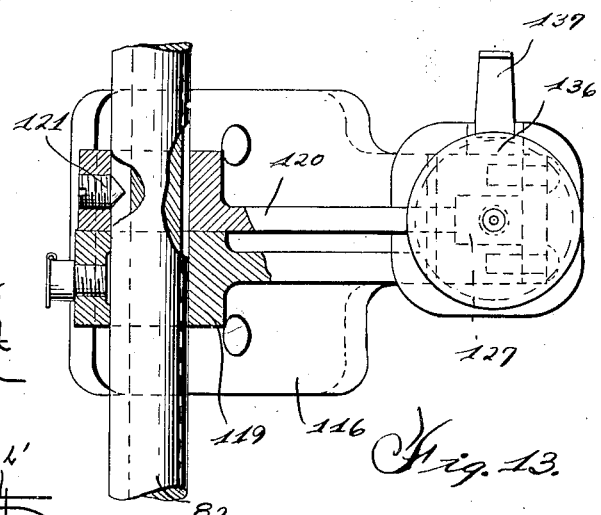
INVENTORS
Frederick N. Ross
Horace L. Johnson
BY
Whittemore, Hulbert, Whittemore & Belknap
ATTORNEYS

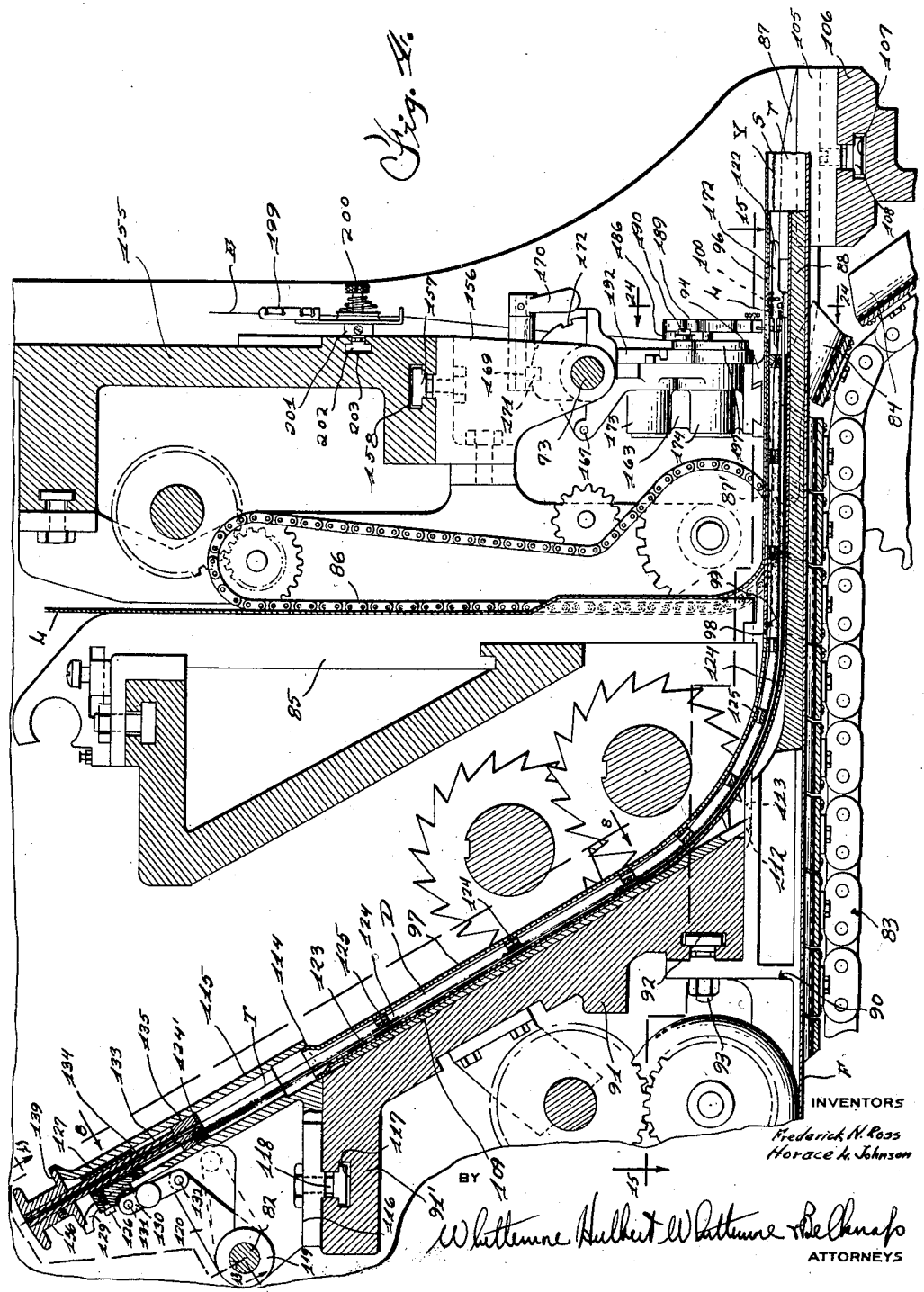

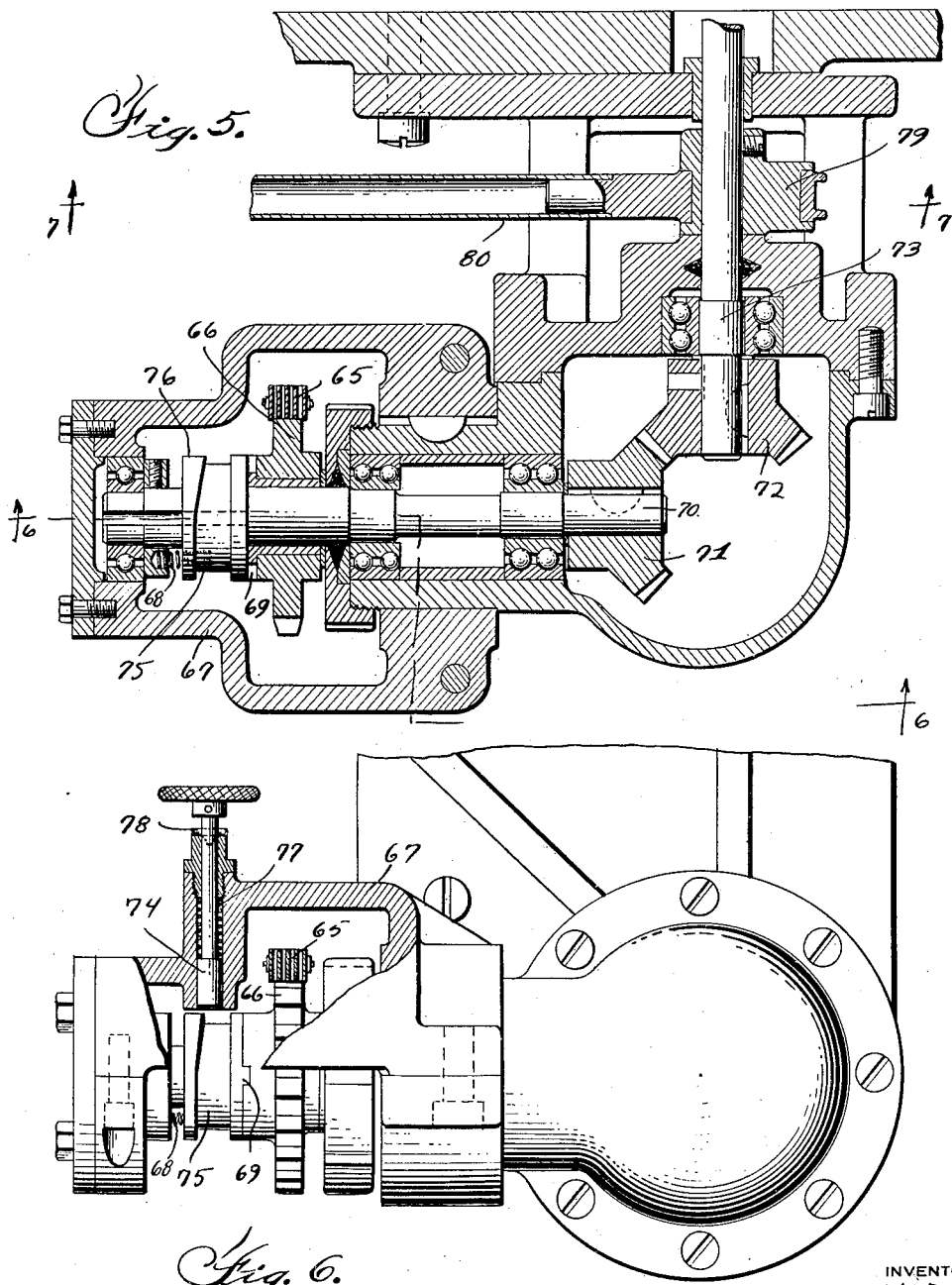

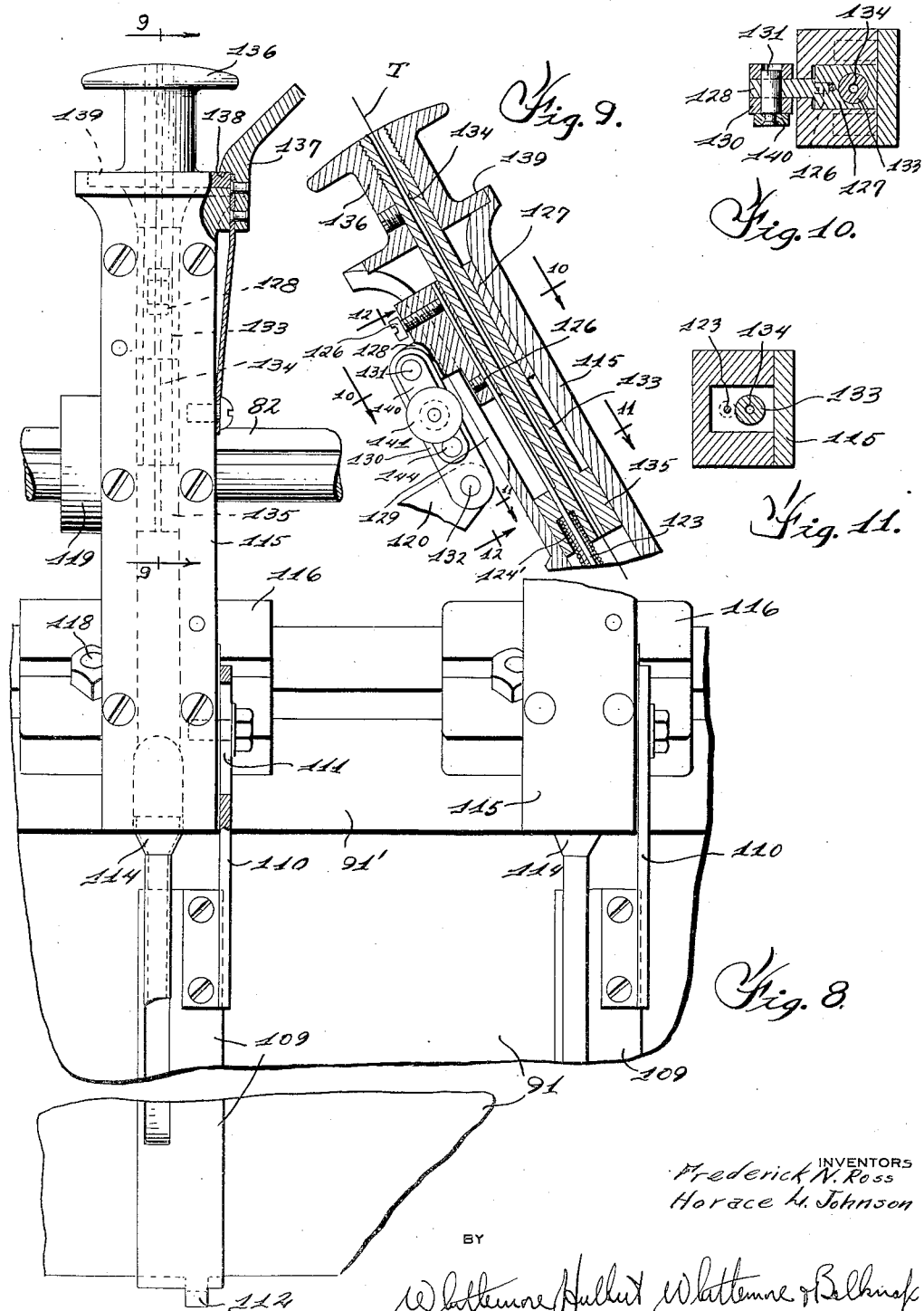

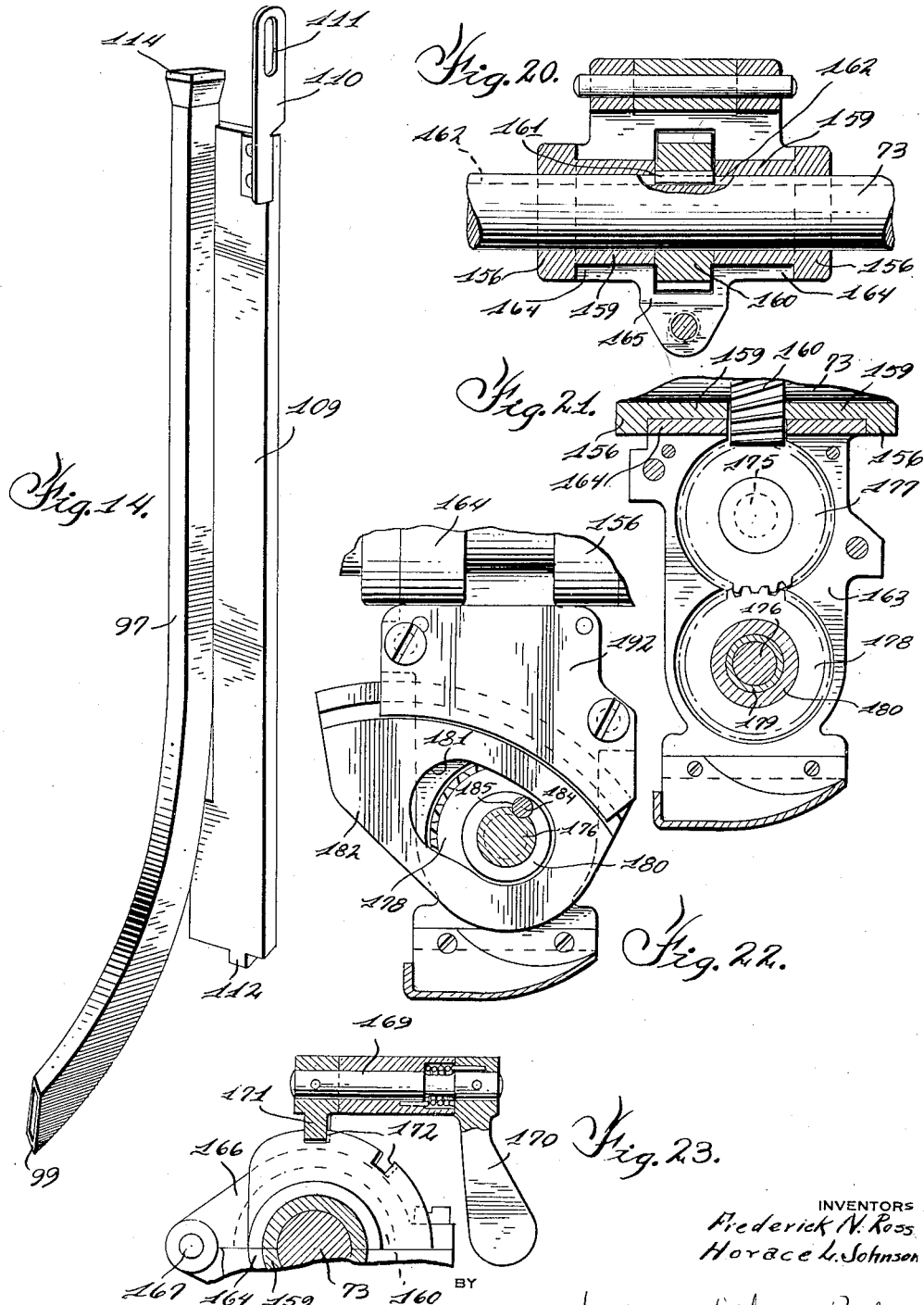

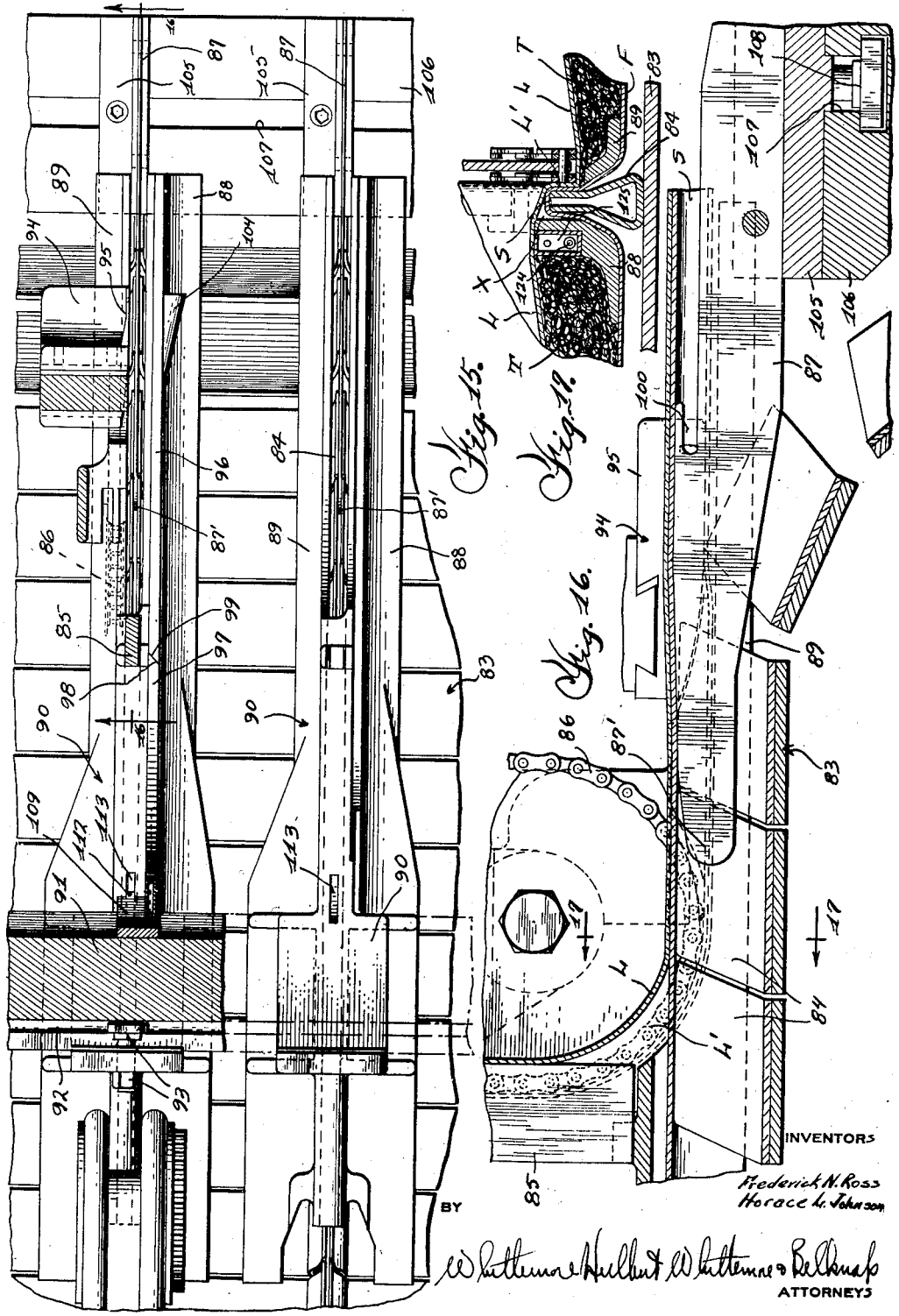

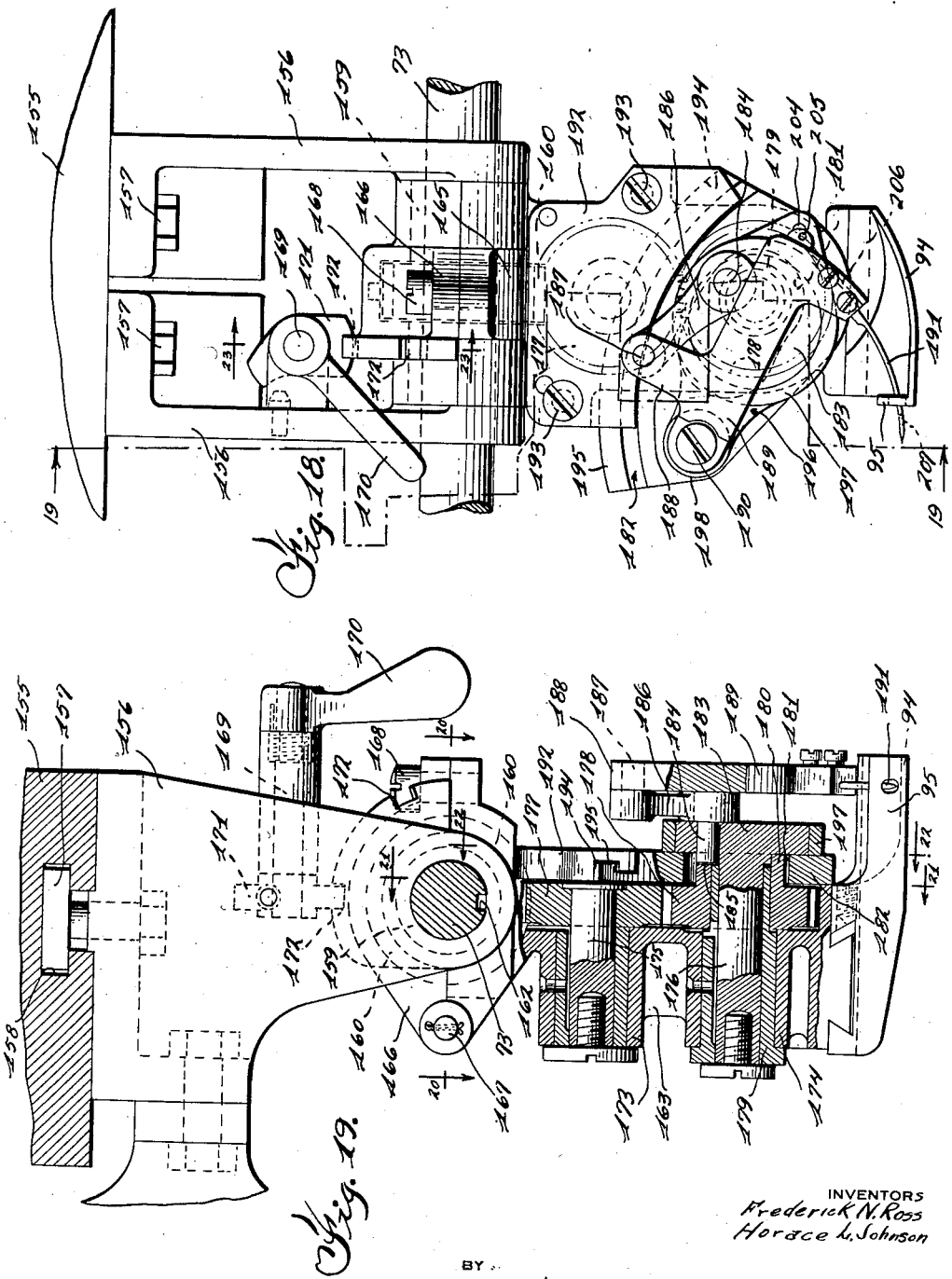

June 2, 1936.  F. N. ROSS ET AL  2,043,064
SEWING LOOPER MECHANISM
Filed Oct. 20, 1930  13 Sheets-Sheet 11
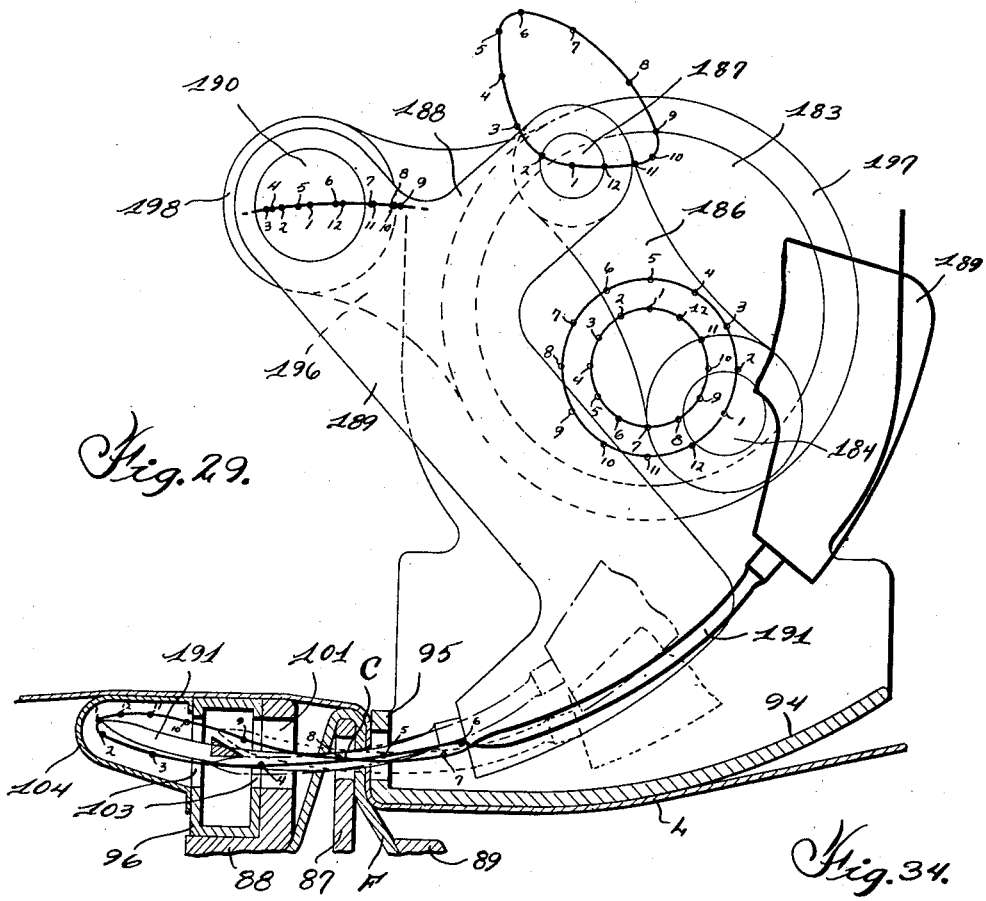
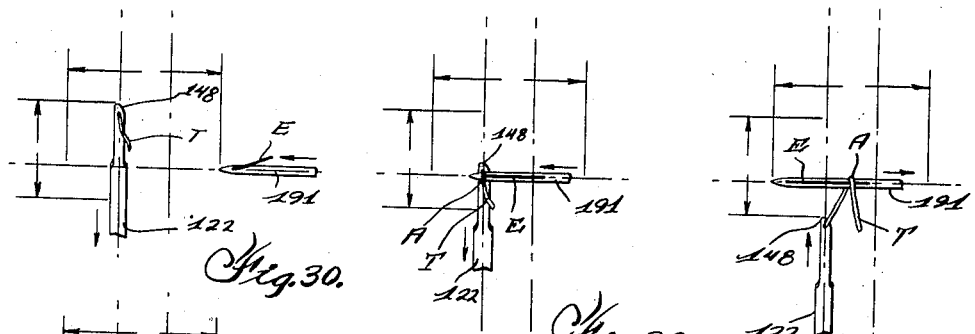
INVENTORS
Frederick N. Ross
Horace L. Johnson
BY
ATTORNEYS INVENTORS
Frederick N. Ross
Horace L. Johnson Patented June 2, 1936

2,043,064

UNITED STATES PATENT OFFICE 2,043,064

SEWING LOOPER MECHANISM

Frederick N. Ross and Horace L. Johnson, Detroit, Mich., assignors, by mesne assignments to Briggs Manufacturing Company, Detroit, Mich., a corporation of Michigan Application October 20, 1930, Serial No. 490,034

6 Claims. (Cl. 112—197)

This invention relates to a method and apparatus of manufacturing upholstery for seat cushions and the like and more particularly to an improved construction of sewing mechanism employing a threaded thrusting and retracting needle and a threaded reciprocating looper.

This is a companion case to our application, Serial No. 400,317 and relates in general to a similar means for and method of producing tubular upholstery. As a consequence, this present invention has as one of its important objects to eliminate all of the known objections to heretofore known types of automatic upholstery manufacturing mechanisms and to produce automatic and continuous upholstery having the characteristics of the heretofore known manually executed methods of upholstery manufacture.

The several objects, advantages and novel details of construction of the invention together with the combination and arrangement of parts and the manner in which our improved method is carried into execution will be made more apparent as this description proceeds, especially when considered in connection with the accompanying drawings, wherein Figure 1 is a fragmentary side elevational view of a portion of an upholstery sewing machine constructed in accordance with our invention;

Figure 4 is an enlarged fragmentary vertical sectional view through the sewing mechanism showing the adjacent associated parts including the finish and lining fabric formation mechanism and the cotton bat feeding mechanism;

Figure 5 is an enlarged fragmentary horizontal sectional view taken substantially on the plane indicated by the line 5—5 in Figure 1 looking in the direction of the arrow;

Figure 6 is a vertical sectional elevational view taken substantially on the plane indicated by line 6—6 in Figure 5;

Figure 7 is a fragmentary sectional view through a portion of the looper driving mechanism taken substantially on the plane indicated by line 7—7 in Figure 5;

Figure 8 is an elevational view as viewed substantially on the line 8—8 of Figure 4 and in the direction of the arrow;

Figure 9 is a fragmentary longitudinal sectional view through a portion of the looper mechanism taken substantially on the plane indicated by line 9—9 in Figure 8;

Figure 10 is a transverse sectional view taken substantially on the plane indicated by line 10—10 in Figure 9;

Figure 11 is a transverse sectional view taken substantially on the plane indicated by line 11—11 in Figure 9;

Figure 12 is a sectional view taken substantially on the plane indicated by line 12—12 in Figure 9;

Figure 13 is a sectional elevational view taken substantially on the plane indicated by line 13—13 in Figure 4;

Figure 14 is a perspective view of a portion of the looper housing;

Figure 15 is an enlarged sectional elevational view taken substantially on the plane indicated by line 15—15 in Figure 4 looking in the direction of the arrow with parts being omitted for the purpose of clearness;

Figure 16 is an enlarged fragmentary vertical sectional view taken substantially on the plane indicated by line 16—16 in Figure 15;

Figure 17 is a fragmentary vertical sectional view taken substantially on the plane indicated by line 17—17 of Fig. 16 and looking in the direction of the arrow showing the manner in which the lining and finish fabrics and the cotton bat are presented to the sewing mechanism;

Figure 18 is a fragmentary front elevational view of one of the sewing heads and its supporting mechanism;

Figure 19 is a vertical sectional elevational view taken substantially on the line 19—19 of Fig. 18;

Figure 20 is a fragmentary horizontal sectional view taken substantially on the plane indicated by line 20—20 in Figure 19;

Figure 21 is a vertical sectional elevational view taken substantially on the plane indicated by line 21—21 in Figure 19;

Figure 22 is a sectional elevational view taken substantially on the plane indicated by line 22—22 looking in the direction of the arrows in Figure 19;

Figure 23 is a fragmentary vertical sectional view taken substantially on the line 23—23 in Figure 18;

Figure 24 is an enlarged vertical transverse sectional elevational view through the apparatus at the sewing point of the sewing heads showing two of the sewing heads fragmentarily and the mechanism for presenting the finish and lining fabrics and cotton bat to the sewing mechanism together with the section through the tubular formation;

Figure 25 is a side elevational view of the looper;

Figure 26 is a top plan view of the looper;

Figure 27 is an end view of the point end of the looper;

Figure 28 is a vertical sectional view through the looper taken substantially on the plane indicated by line 28—28 in Figure 26;

Figure 29 is a semi-diagrammatic view showing graphically the movement of the needle arm and needle together with its operation mechanism with respect to the seam and the looper, the two extreme positions and two of the intermediate positions of the needle and needle arm being indicated respectively by light lines, heavy lines, dotted lines, and dot and dash lines;

Figure 30 is a diagrammatic view graphically illustrating the relative positions of the looper and needle when the parts are in the position shown by black lines in Figure 29;

Figure 32 is a diagrammatic view showing graphically the position of the needle and looper in the dotted line position illustrated in Figure 29;

Figure 34 is a diagrammatic view illustrating graphically the position of the needle and looper in the light line position shown in Figure 29;

Figure 36 is a diagrammatic view showing graphically the positions of the needle and looper as illustrated in dot and dash lines in Figure 29;

Figure 46:
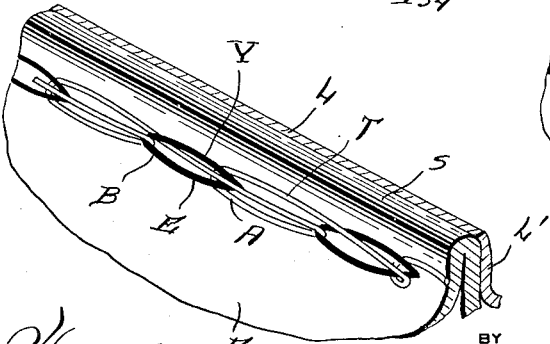
Figure 47:
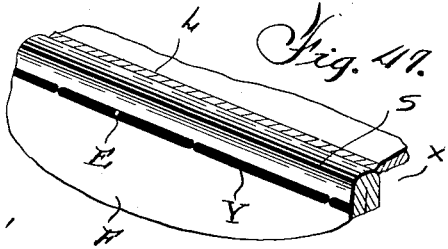

Figures 38 to 45 inclusive are semi-diagrammatic perspective views of the needle and looper showing the development of the stitches;

Figure 46 is a fragmentary sectional perspective view of the completed stitching as viewed from one side of the seam;

Figure 47 is a similar view as viewed from the other side of the seam;

Figure 48 is a semi-diagrammatic view showing the manner in which the finish and lining fabrics are arranged during the sewing operation, and Figure 49 is a similar view of the completed upholstery, with the cotton bat omitted, with the lining fabric stitched taut.

Referring first to Figures 48 and 49, the general problem involved will be explained. In these figures the finish or top fabric of the cushion or upholstery is indicated by the reference character F and the bottom or lining fabric is indicated by the reference character L. It will be understood that these fabrics are united in the machine with the lining or bottom fabric on top.

It is the purpose of this invention to provide a method and means for uniting the finish and lining fabrics to provide a plurality of plaits or tubes with the stitching extending from the outside of the lining fabric into the interior of the tubes where the stitching is completed. In accordance with this invention, the finish fabric is gathered to provide a plurality of spaced parallel tucks or folds S and the lining fabric is arranged in superposed relation over the finish fabric with portions L' adjacent to and parallel with the folds S at one side thereof. The lining fabric is spaced from the folds at the other sides thereof to produce clearance spaces X for the looper and needle to enable the completion of the loop of the stitch within the completed tubular formation T.

The finish and lining fabrics are united by transverse stitching Y extending from the outside through the portions L' of the lining L and through the folds S of the finish fabric F, the loopers, yet to be referred to, working in the spaces X and the needles extending from the exterior of the tubes into the spaces X where the chain or loop of the stitches is completed.

When the upholstery is subsequently applied to the seat, the lining fabric L is stretched taut but as will be noted from Figure 49, no strain whatsoever will be imparted to the stitching Y because with the herein described method of stitching, seam ridges are not produced in the lining material. Moreover, the stitching is substantially invisible on the face of the complete upholstery and in this respect the finished upholstery is substantially the same as that constructed by the heretofore known manual methods of manufacture.

Figure 1:
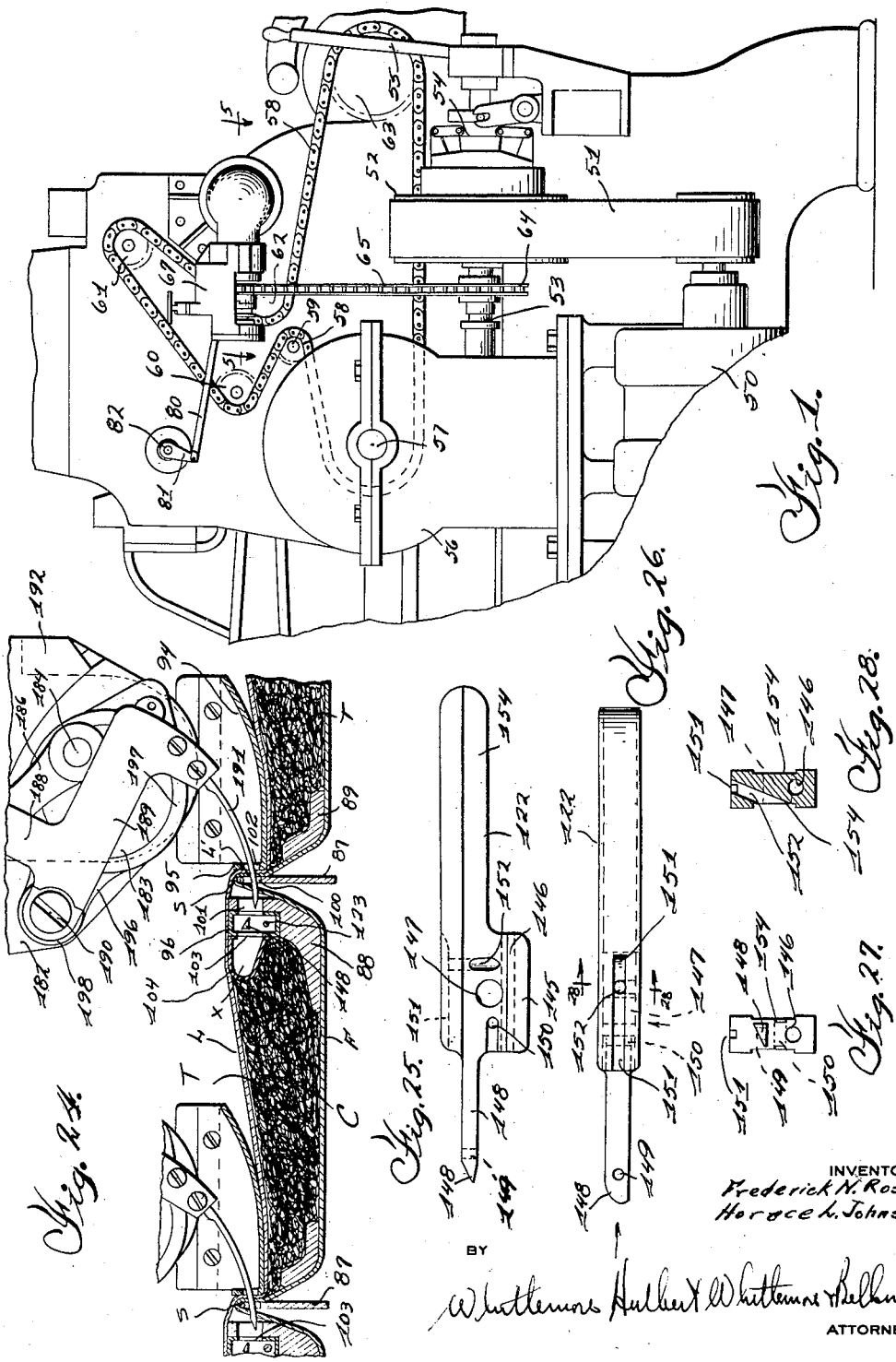

By reference to Figure 1, the drive mechanism for the several parts of the apparatus will be described. The reference character 50 indicates a motor through which a belt 51 drives a pulley 52 which may be coupled to shaft 53 by means of a clutch mechanism 54 controlled by lever 55. The shaft 53 is connected to a reduction gearing contained in housing 56. Through this reduction gearing a main shaft 57 is driven. This shaft carries a sprocket wheel with which a chain 58 engages, this chain passing an idler 59 and then around a sprocket wheel 60 which drives the cloth or finish fabric forming mechanism. The chain also passes around a sprocket 61 on the drive shaft of the lining or foundation forming mechanism and then around a sprocket 62 which drives the cotton bat feeders. From this latter sprocket the chain passes a sprocket wheel 63 which drives the front roll of the machine. Obviously, all of these parts are driven in timed relation at a reduced speed in accordance with the reduction gearing contained in the housing 56.

Mounted on the shaft 53 is a sprocket wheel 64 which is connected by means of a sprocket chain 65 to a sprocket wheel 66 contained in a housing 67, see more particularly Figures 5 and 6. This sprocket wheel 66 is rotatably loosely mounted on a shaft 70 with which it may be connected for rotation therewith by means of a clutch 69 comprising a hub splined on the shaft 70 and normally urged into clutching position by a spring 68. The shaft 70 carries a bevel pinion 71 meshing with a bevel pinion 72 on a shaft 73. This shaft 73 is the drive shaft for the sewing heads yet to be referred to.

When it is desired to stop the operation of the sewing heads the clutch 69 is disengaged by permitting clutch control pin 74 to engage in the cam groove 75 of sleeve 76, splined on shaft 68. The clutch control pin 74 is normally urged in a downward direction by a spring 77 and may be permitted to engage the cam groove 75 by rotating the clutch control pin to permit the transverse pin 78 to enter a slot (not shown) in the sleeve or bushing which surrounds the pin 74 adjacent the transverse pin 78. Engagement of the pin 74 with the cam portion of the groove 75 in the clutch hub, when the latter is rotated, causes said clutch hub to be withdrawn from clutching engagement with the sprocket 66, permitting the latter to run free.

The sewing head driving shaft 73 is provided with an eccentric 79 to which a pitman rod 80 is connected, see particularly Figures 5 and 7. This pitman rod is connected to an arm 81 keyed to a looper drive shaft 82 so that rotation of the sewing head drive shaft 73 will cause an oscillation of the looper drive shaft 82.

By reference to Figures 2, 3, 4, 15, 16 and 24, the means for presenting the finish and lining fabrics to the sewing mechanism and the manner in which these fabrics are presented to the sewing mechanism will be more apparent. The finish fabric F is fed to the sewing mechanism by means of an endless conveyer 83 which is provided with a plurality of upstanding bifurcated projections 84 (see also Figs. 15, 16 and 17) which in the upper flight of the conveyer 83 will produce a plurality of longitudinally extending spaced parallel ribs which gather the finish fabric F to produce tucks or folds S.

The lining fabric L is fed downwardly from above between stationary formers 85 and driven chain members 86, which cooperate with the stationary formers 85 to form the lining fabric and to feed the same to the sewing mechanism. By means of the lining fabric forming mechanism 85—86 the lining fabric L is presented to the sewing mechanism with portions thereof lying adjacent to and parallel with the tucks or folds S at one side thereof as previously described in connection with Figure 48 and as clearly illustrated in Figure 24.

The folds S formed in the finish fabric F are presented over vertically arranged sewing plates 87 (see particularly Fig. 16) the ends of which are embraced by the bifurcated projections 84 and receive the folds therefrom. Said folds S are maintained with respect to each sewing plate 87 by means of forming feet 88 and 89 arranged on opposite sides of the sewing plate as most clearly illustrated in Figure 24. The feet of each pair are bifurcations of a member 90 which is adjustably connected to a beam 91 (see particularly Fig. 4) which extends transversely of the machine and constitutes a stationary part thereof. The members 90 are secured to the beam 91 for adjustment transversely of the machine so that the spaces between the seams may be varied as desired and for this purpose the beam 91 is provided with a transversely extending T-shaped slot 92 and the members 90 are provided with adjusting bolts 93 by means of which these members may be secured in place.

Cooperating with each sewing plate 87 and carried by the respective sewing mechanism is a shouldered plate member 94 having a vertically extending flange portion 95 which lies adjacent to and parallel with the upper margin of the sewing plate to hold the lining fabric L adjacent to and parallel with the fold S at one side thereof, for instance, as is clearly illustrated in Figure 24.

Each member 90 has a section 96 of the corresponding looper housing attached permanently thereto, this section of the looper housing cooperating with a removable section 97, see Figures 4 and 14, to provide a complete enclosure for the looper mechanism. The right hand end of this permanent section 96 of the looper housing terminates a short distance to the right of the sewing mechanism as viewed in Figure 4, and the rear edge of this stationary section 96 is preferably inclined as at 98 (Fig. 3) to cooperate with a similarly inclined end 99 of the removable housing section. Thus, relative vertical movement between the meeting ends 98 and 99 of the housing sections is prevented when the removable section has been secured in place.

As seen probably most clearly in Figures 16 and 24, each sewing plate 87 is provided with an open end slot 100 providing a passage through the sewing plate for the needle of the associated sewing mechanism and the feet or plate members 88 and 95 are provided with registering apertures 101 and 102 for the needle. Coincident with the aperture 101 is a pair of opposed apertures 103 in the looper housing 96 so that the needle may have a thrusting and retracting movement at right angles to the sewing plate in a manner and by means to be referred to more fully hereinafter.

As shown quite clearly in Figures 15 and 24, the looper housing 96 is provided with a tapered needle guard 104 which is arranged in the plait or tube formed by the finish and lining fabrics F and L respectively, to maintain free and clear the needle space X previously referred to in the description of Figure 48. This guard acts as a barrier to prevent the cotton bat C from becoming entangled with the needle point.

The sewing plates 87 extend between the bifurcations 88 and 89 of the member 90 and act, as heretofore mentioned, to receive the folds S presented thereto by the finish fabric formers 84. While the bifurcations 88 and 89 which provide the formers or feet for maintaining a fold on the corresponding sewing plate 87, are mounted at their left hand end as viewed in Figures 4, 15 and 16, and extend toward the right in the direction of the movement of the finish and lining fabrics, the sewing plates 87 are mounted at their right hand ends and extend between the bifurcations 88 and 89 in a direction opposed to the travel of the finish and lining fabrics. As has been previously described, the formers 88 and 89 are mounted as a unit for adjustment transversely of the machine to vary the distance between adjacent seam ridges, so also the sewing plates are mounted as to be capable of transverse adjustment for a like purpose. The manner in which this is accomplished is best illustrated by a comparison of Figures 2, 3, 4, 15 and 16. From these figures it will be noticed that each sewing plate 87 is secured by means of a bracket 105 onto a cross beam 106 extending transversely of the machine. This bracket is provided with a T-shaped slot 107 with which an adjustment bolt 108 cooperates to adjustably secure the brackets and consequently the sewing plates 87 thereto. The forward end or extremity 87' of each sewing plate acts to receive and strip the fold S from the finish fabric formers 84. Thus the finish and lining fabrics F and L respectively are presented to the sewing mechanism associated and arranged with respect to one another as clearly illustrated in Figure 24 whereby the needle of each sewing mechanism may have a thrusting and retracting movement through the fold in the finish fabric and the parallel portion of the lining fabric at substantially right angles to the longitudinal center of the fold.

By reference particularly to Figures 3, 4, 7, 8, 9, 10, 11, 13, 14, 15 and 25 to 28 inclusive, the looper mechanism and the operating means therefor will be described. As previously mentioned the looper housing consists of a stationary section 96 and a removable section 97. This latter section rests upon and is supported adjacent the transverse beam 91 of the machine and as shown in Figure 14, the housing section is provided with a backing plate 109 which at its upper end carries a bracket 110 slotted as at 111 and at its lower end carries a tongue 112. As shown in Figure 4, the backing plate 109 rests against the beam 91 and in positioning the same in place the tongue 112 engages a locating slot 113 formed in the upper face of the member 90, see particularly Figures 4 and 15. In connection with Figure 15 it will be noted that the top half of this figure shows the looper housing in place while the lower half of this figure shows the looper housing removed.

The upper end of the looper housing is enlarged as at 114 to telescope within the lower end of a tubular member 115 which latter is provided with a bracket 116 adapted to be adjustably connected to a substantially horizontally arranged portion 91' of the bracket 91. For providing for this adjustable mounting, the bracket portion 91' is formed with a T-slot with which the clamping bolts 118 engage.

Each bracket 116 has a portion 119 which constitutes a bearing support for the looper shaft 82 and keyed to this shaft 82 are a plurality of levers 120, one for each looper mechanism. The key 121 for the lever 120 permits of adjustment of lever 120 with respect to the shaft 82 longitudinally thereof but prevents relative rotation of the shaft.

The looper 122 shown in Figures 25 and 26 is adapted to be reciprocated in its housing by means of a flexible shaft 123 in the form of a piano wire. This wire 123 is enclosed in a flexible guide housing 124 supported at longitudinally spaced points in the housing 96—97 by means of guides 125. Each of these guides 125 is apertured to permit the passage therethrough of the thread T. The piano wire 123 extends up into the tubular housing 115 and is clamped as, for instance, by means of set screws 126 to a reciprocating head 127 which is adapted to be reciprocated in the tubular housing 115. This head 127 has a lug or ear 128 extending laterally therefrom through a slot 129 in the housing 115. A link 130 is pivotally connected to the ear 128 as at 131 and is pivotally connected as at 132 to the lever 120. Thus oscillation of shaft 82 causes a rocking movement to be imparted to lever 120 which through link 130 will reciprocate the head 127 and through the flexible shaft or piano wire 123 will reciprocate the looper 122.

The head 127 is guided during its reciprocating movement by the housing 115 and is also provided with a longitudinal opening or bore capable of receiving a tubular thread guide 133. The thread T previously referred to passes in through the longitudinal bore 134 of the thread guide 133 and then through the housing and through the apertures of the guides 125 previously referred to.

The lower end of the thread guide tube 133 is provided with an enlarged portion 135 which fits snugly within the tubular housing 115 to locate the lower end of the guide therein, this enlarged portion also providing means for securing the end 124' of the flexible guide housing 124 of the piano wire or flexible shaft 123.

The upper end of the thread guide 133 is provided with a knob or handle 136 which is adapted to engage the flared upper end of the guide housing 115 and for preventing accidental removal of the thread guide tube 133 we provide a spring latch 137 having a latch shoulder 138 adapted to snap over an annular flange 139 on the knob 136.

The link 130 is detachably connected to the ear or lug 128 by means, probably most clearly illustrated in Figure 12. The pivot 131 is carried by a plate 140 and is capable of being laterally withdrawn from engagement with the lug 128 by means of a handle 141. The plate 140 is drawn laterally away from the link 130 against the action of a spring 142 acting on a headed pin 143. The pin 144 is merely a guide. The knob 141 is grasped and pulled toward the right as viewed in Figure 12, which action withdraws the pivot 131 from engagement with the ear or lug 128 so that the operative connection between the link 130 and the reciprocating head 127 may be disconnected.

When this link has thus been disconnected the latch 137 may be actuated to release the knob 136 whereupon this knob together with the guide tube 133, the reciprocating head 127 and the looper operating shaft 123 together with its guides 124 and the looper 122, may be withdrawn from within the looper housing 96—97. This is for the purpose primarily of threading the looper which is to be accomplished in a manner to be hereinafter more fully referred to although obviously the looper mechanism may be withdrawn as just described for the purpose of replacing worn parts or replacing broken parts.

The looper or looper head is illustrated in side elevation and top plan view respectively in Figures 25 and 26, in end elevation in Figure 27 and in section in Figure 28. By reference to Figures 25 and 26 and also possibly to Figure 38, the construction of the looper itself and of the manner in which it is initially threaded and subsequently carries the thread will be apparent.

The looper 122 is provided with a depending portion or projection 146 longitudinally apertured as at 146 to receive the end of the actuating shaft or wire 123 which may be secured thereto by means of a pin 147. The point 148 of the looper is apertured as at 149 and the body of the looper is provided with a transverse aperture 150. The aperture 150 extends transversely of the looper and the apertures 149 vertically with respect to the point 148. The top surface of the looper is provided with a longitudinal groove 151 and with a communicating vertically inclined aperture 152. As will be seen from Figure 38 the thread is passed first through the transverse aperture 150 from the far side as viewed in Figure 25 and out through the near side of this aperture and then over the point 148 and up through the vertical aperture 149, then back through the groove 151 and downwardly through the inclined aperture 152 and out through the near side of the looper where the free end is left. After a few stitches, as will be apparent from an examination of the successive Figures 38 to 45 inclusive, the free end of the thread is drawn out of the aperture 152 and groove 151 but always remains threaded through the point at 150 and 149.

The transverse cross-section of the looper is such that it fits within and is guided for reciprocation within the housing which is of substantially the same cross-section but in order to provide relief for the looper and to reduce the surface contact between the looper and housing, the vertical sides of the looper which are the greatest cross-section are relieved as at 154.

The looper as will be obvious, is reciprocated within the housing in a plane at right angles to the plane of the thrusting and retracting movement of the needle, yet to be referred to, and in a path which intersects at right angles the path of the needle. The looper is reciprocated in a plane substantially parallel with and adjacent to the longitudinal vertical plane of the tuck or fold S. The looper is also reciprocated within the plait or tube formed by the finish and lining fabrics F and L and this permits the formation and completion of the stitch interiorly of the plait or tube in a manner to be more fully hereinafter described.

The reference character 155 indicates a transverse beam or frame portion of the machine upon which the sewing heads are mounted. Obviously, there is one sewing head for each looper mechanism and a number of sewing heads corresponding to the number of folds S presented to the sewing mechanism. Each of the sewing mechanisms which includes means for imparting a combined thrusting and retracting and rocking movement to the needle is supported on the sewing head shaft 73 and by a pair of depending brackets 156. These brackets which are substantially inverted L-shaped are adjustably secured to the lower face of the beam or frame member by means of clamping bolts 157 which engage substantially T-shaped slots 158 formed in the beam 155. Each bracket member 156 has an inwardly extending sleeve 159 which surrounds the shaft 73, the ends of these sleeves abutting against opposite sides of the driving pinion 160. This pinion 160 is keyed to the shaft 73 by a key 161 working in a longitudinal key-way 162 in the shaft so that the pinion will rotate with the shaft but will be capable of longitudinal movement thereon when adjusted.

The sewing head has a main body or bracket part 163 which is provided at its upper end with semi-circular tubular bearing extensions 164 engaging the sleeves 159 and with a central semi-circular recess 165 enclosing the lower half of the pinion 160. The bearing extensions 164 and the pinion enclosure 165 are completed by a cap 166 which has corresponding portions, this bearing cap being pivotally connected to the main body bracket 163 as at 167 and being secured in place as, for instance, by means of a bolt 168. Therefore, the sewing head bracket 163 is mounted upon the main supporting brackets 156 and may be adjusted longitudinally of the shaft 73 when the brackets 156 are adjusted.

In order that the sewing heads may be swung upwardly out of operative position so as to permit ready access to the other mechanism adjacent the stitching point, one of the brackets 156 of each pair thereof is provided with a rotatably mounted lock cam shaft 169, see Figures 2, 3, 18 and 19, upon one end of which is a handle 170 and upon the other end of which a locking cam 171 is arranged. This cam is adapted to be engaged in either one of a pair of notches 172 located in an arcuate flange on the cap portion 166 of the bracket. Thus, the locking cam 171 may be engaged with one of the notches to hold the sewing mechanism in its operative position as illustrated by one of the sewing heads in Figures 2 and 3, or the sewing head may be swung about the drive shaft 73 to a raised inoperative position and secured in this position by engaging the latching cam 171 with the other of the two notches 172.

The main body is provided with lateral extensions 173 and 174 in which are journaled the shafts 175 and 176 of intermeshing pinions 177 and 178, the upper of these two pinions 177 meshing with the corresponding drive pinion 160 keyed to the shaft 73.

The bearing sleeve 179 of shaft 176 extends beyond and to the right of pinion 178 as does a hub portion 180 formed on this pinion. This hub extension 180 extends through an arcuate slot 181 in a slide or sector 182. The end of shaft 176 is provided with an eccentric crank disk 183 and a crank pin 184 extending therethrough beyond the left hand face of this eccentric crank disk 183 as viewed in Figure 19, and engages a recess 185 in the hub extension 180 to key or lock the eccentric crank disk 183 to the pinion 178 so that the two will rotate in unison.

Pivotally mounted on the crank pin 184 is a needle arm actuating link 186 having the other end thereof pivotally connected as at 187 to a lateral extension 188 on a needle arm 189. This needle arm is pivotally mounted on a pivot pin or projection 190 projecting from the face of the sector or slide 182. Thus, when the eccentric crank disk 183 is rotated, the crank pin 184 actuates the needle arm actuating link 186 which will rock the needle arm 189 about its pivot 190 to impart a thrusting and retracting movement to the needle 191.

The slide or sector 182 is mounted for a sliding reciprocating movement by means of a bracket 192 fixed to the sewing head body 163 by means of bolts 193. This bracket is provided with an arcuate guideway 194 with which an interfitting portion 195 formed on the upper end of the slide 182 engages.

The slide 182 is adapted to be reciprocated in its guideway during the thrusting and retracting movement of the needle and in timed relation thereto and for accomplishing this I provide the eccentric disk 183 with a strap 197 which is connected by an arm 196 with the pivot 190 carried by the slide 182 and upon which the needle arm 189 is pivotally mounted. Thus, the rotation of the eccentric crank disk 183 imparts a thrusting and retracting movement to the needle 191 and a reciprocating movement in an arcuate path to the slide 182 and consequently to the pivot 190 of the needle arm. This rocks the needle 191 during its thrusting and retracting movement because of the movement of the supporting pivot 190 through an arcuate path.

The needle is of arcuate or bowed longitudinal configuration and the needle is reciprocated on an arcuate path about the center 190 which center is shifted on an arc struck from a point in the arcuate path of the needle. The needle rocks substantially about a point coincident with the center line of the seam so that irrespective of the rocking movement imparted to the needle, the needle always pierces the fabrics in the same horizontal plane.

The rocking movement of the needle is for the purpose of spreading the loop formed thereby and thus provides a positively spread loop having sufficient clearance to permit the same to be taken up by the looper which intersects the path of travel of the needle at the end of this rocking movement.

As was previously mentioned, the looper 122 reciprocates in a path or vertical plane arranged at substantially right angles to the path of movement of the needle 191. The movement of the looper and needle are so co-related and timed that the point 148 of the looper is first reciprocated past the path of travel of the needle and is partaking of its return stroke as the needle partakes of its thrusting movement. As the looper is passing the path of the needle, the needle passes over the looper point 148 and through the loop carried by the looper, the needle continuing its forward thrusting movement while the looper continues its movement past the needle path. At this time the point of the needle is rocked in a downward direction to spread the loop formed thereby and during this period and at the commencement of the retracting movement of the needle the looper again moves forward to cross the path of the needle as the needle is being retracted. This rocking movement of the needle immediately prior and during the commencement of its retracting movement has lowered the needle to a point below the horizontal path of the looper and has spread the loop carried by the needle so that as the needle is continuing in its retracting movement, the looper is being thrust forward so that its point 148 passes over the receding point of the needle 191 and through the loop which was formed by the needle. This briefly is the cycle of actions of the needle and looper. This cycle is graphically illustrated by a comparison of Figures 29 to 37 inclusive. In Figure 29 the needle 191 is shown in full black lines in its extremely retracted position; in full light lines in its fully forward or thrusting position; in dotted lines in its intermediate thrusting position; and in dot and dash lines in its intermediate retracting position.

Figure 30 illustrates diagrammatically the relative positions of the looper and needle in the full black line position indicated in Figure 29. This position of the parts is also shown in elevation in Figure 31. The relative positions of the needle and looper are diagrammatically shown in Figure 32 corresponding to the dotted line position of the needle illustrated in Figure 29. This position of the parts is illustrated in elevation in Figure 33. Figure 34 shows the relative positions of the needle and looper corresponding to the light line position illustrated in Figure 29. This position of the parts is illustrated in elevation in Figure 35. The relative positions of the needle and looper are diagrammatically illustrated in Figure 36 corresponding to the dot and dash position of the needle illustrated in Figure 29. This position of the parts is illustrated in elevation in Figure 37.

As shown in Figure 36 the looper 148 is at the end of its forward movement in which it has been moved past and has intersected the path of travel of the needle 191. The needle 191 is at the end of its retracting movement and is just about to start its thrusting movement. In Figure 32 the looper is shown intermediate its backward or return movement whereby the loop A formed thereby is being spread by reason of this return movement of the looper. As the end of the looper is about to pass the needle path, the needle is partaking of its thrusting movement and passes through the loop A and continues its forward or thrusting movement to the position illustrated in Figure 34 while the looper 148 continues its return movement to the extreme position illustrated in Figure 34. At this time the loop A formed by the looper has slipped well onto the needle. The needle then rocks to lower its point and spread the loop B formed thereby and during this rocking movement, the needle commences its retracting movement. The rocking of the needle has lowered the point thereof below the horizontal path of travel of the looper which is partaking of its forward or thrusting movement while the needle is partaking of its retracting movement. Hence, the looper point 148 passes over the needle and through the loop carried thereby so as to take up and hold the needle loop. As the looper commences its retracting movement its loop is again spread and the needle is again partaking of its thrusting movement to pass over the looper end and take up the loop being formed thereby. Obviously, this cycle of operations continues so that a single chain lock-stitch such as illustrated in Figures 46 and 47 inclusive is produced.

An important feature of this invention is the construction and arrangement of the sewing head whereby the needle is not only caused to simultaneously partake of a thrusting and retracting movement and a rocking movement but is also so actuated and controlled that it moves at differential speeds, moving slower at the end of its thrusting and retracting movements. At the end of its thrusting movement its movement is retarded to permit the looper to take up the loop formed by the needle and its speed is retarded at the end of its retracting movement so that the needle may be kept out of engagement with the fabrics a maximum length of time. Thus, the speed with which the seam may be sewed is increased because the fabrics will be permitted to travel transversely to the path of the needle without being retarded by the needle during a large portion of each sewing operation.

In order to graphically illustrate this, the path described by the point of the needle has been illustrated in Figure 29 and this path of travel has been divided into 12 increments numbered accordingly and starting with the position of the parts illustrated in light lines in Figure 29, that is with the needle point at the extreme end of its thrusting position. In a like manner the arcuate path of the pivot 190 of the needle arm 189 has been indicated and has been divided into a corresponding number of increments. Moreover the circular path of travel of the crank pin 184 has been correspondingly divided and numbered as has the pivotal connection 187 between the needle arm actuating link 186 and the needle arm 189. By particular reference to Figure 29 the construction and arrangement of parts by which this differential movement of the needle is accomplished will be described.

As will be noted by reference to the numbered increments indicating the travel of the point of the needle, the last part of the forward or thrusting movement of the needle and the first part of the retracting movement of the needle occurs comparatively slowly. The increments numbered 2, 3, 4 and 5 indicate that the movement of the needle from the point 2 to the point 6 which is substantially the end of its retracting movement, occurs relatively rapidly. The increment between the points 6 and 7 is relatively small indicating that the needle travels relatively slowly at the end of its retracting movement and at the beginning of its thrusting movement whereas the distances between the points 7, 8, 9 and 10 indicate that this portion of the forward movement of the neede occurs relatively rapidly. Thus, the needle is thrust through and retracted through the fabrics relatively rapidly but moves more slowly at both ends of its stroke or movement.

The corresponding movement of the crank pin 184, the pivotal connection between the crank arm 186 and the needle arm 189, and the movement of the needle arm pivot 190 may also be readily ascertained by a comparison of the numbered increments of movement as they appear in Figure 29. By reason of the crank pin and crank arm connection between the eccentric crank disk 183 and the needle arm, the needle arm is moved more slowly during those portions of the cycle of operation when the crank pin 184 passes through the plane of the centers of the crank disk shaft 176 and of the pivot 187. As viewed in Figure 29, this occurs substantially while the crank pin 184 is passing through points 10, 11, 12 and 1, and points 5, 6 and 7 marked on the circular path of the crank pin.

The shifting of the pivot 190 of the needle arm will obviously cause a rocking of the needle arm 191, the greatest movement of the needle arm occurring at the point thereof when the point is partaking of the end of its thrusting movement and the beginning of its retracting movement. The needle is arc-shaped longitudinally, the center of the arc being struck from the center of the pivot 190. Thus, by shifting the center of the pivot 190 for instance, toward the left as viewed in Figure 29, the needle point is rocked downwardly, whereas the shifting of the center of this pivot 190 to the right, the needle point is rocked upwardly. The greatest amount of movement of the center of pivot 190 occurs to the left of a vertical plane passing through the fixed center C so that as a consequence the greatest rocking movement of the needle point occurs at the end of its thrusting movement and at the beginning of its retracting movement as previously described.

This permits of the positive spreading of the loop carried by the needle point so that the loop thus formed may be taken off the needle by the looper.

The center C referred to is the center about which the arcuate path of the pivot 190 is described, and the arc of the needle is described about a center coincident with the center of the pivot 190. As a consequence irrespective of the rocking movement of the needle, the needle always pierces the fabrics on a horizontal plane passing through the center C and the rocking movement of the needle irrespective of its position during its thrusting and retracting movements, rocks about this center point C.

Figure 2:
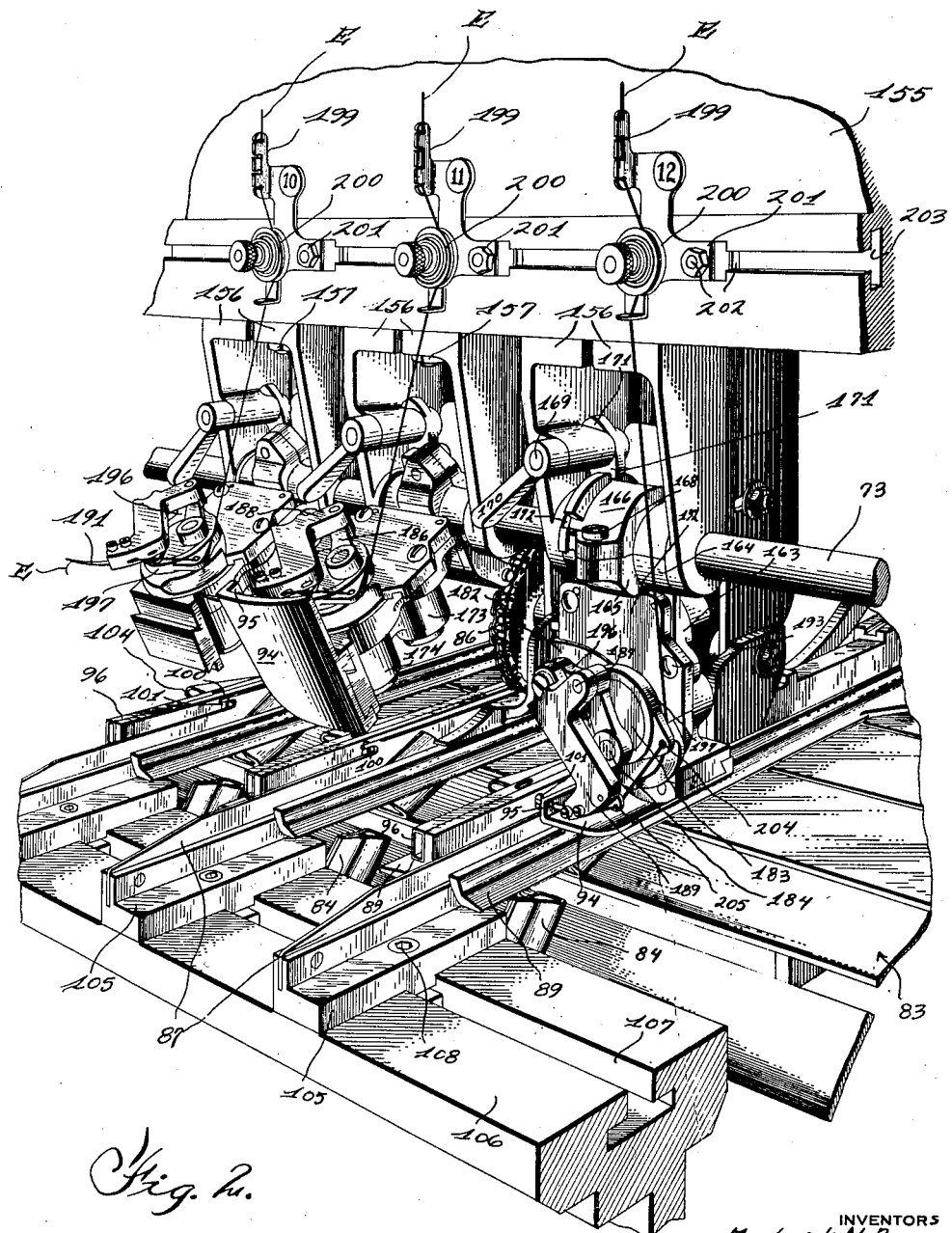
Figure 2 is an enlarged fragmentary perspective view of the sewing mechanism of the machine.
Figure 3:
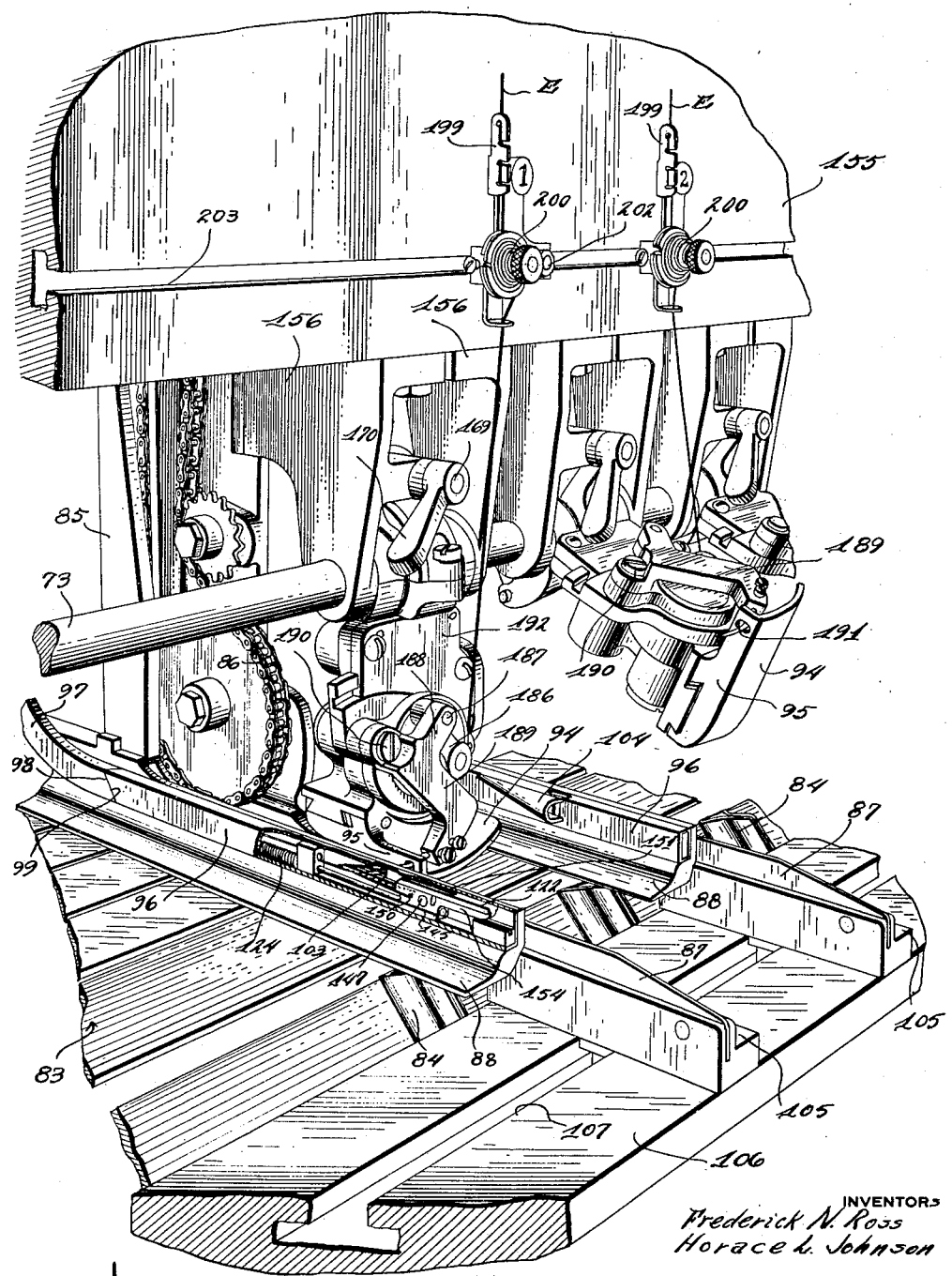
Figure 3 is a similar view of the sewing mechanism as viewed from the other side of the machine, certain of the parts being broken away to show interior construction.
Figure 31:
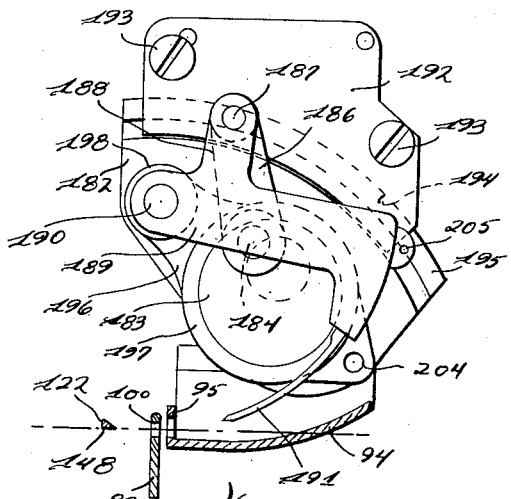
Figure 31 is an elevational view showing the sewing head and the looper in the position shown in black lines in Figure 29.
Figure 33:
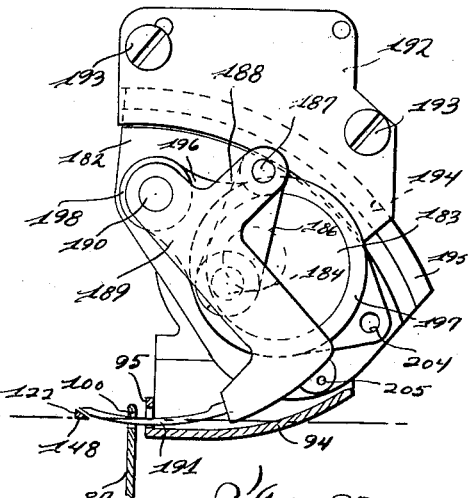
Figure 33 is an elevational view showing the sewing head and the looper in the position shown in dotted parts in Figure 29.
Figure 35:
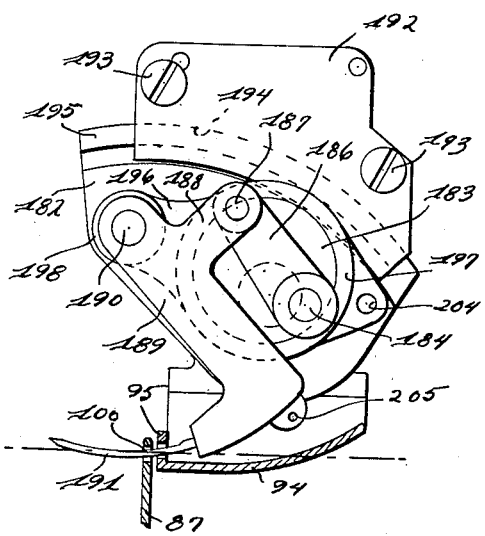
Figure 35 is an elevational view of the sewing head showing the parts in the position illustrated by light lines in Figure 29.
Figure 37:
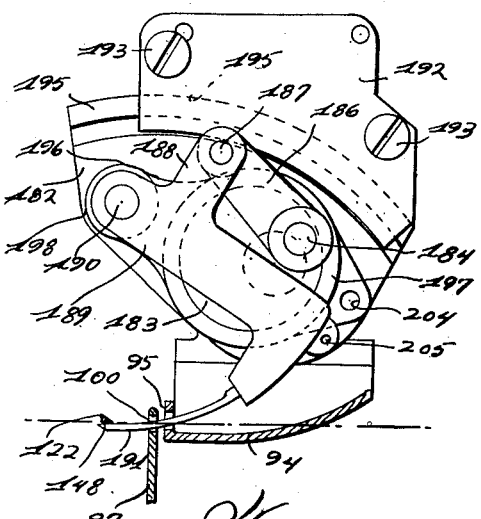
Figure 37 is an elevational view of the sewing head showing the parts thereof in the position illustrated in dot and dash line position in Figure 29.

By reference to Figures 2 and 3 it will be noted that the threads E supplied to the needles are brought down through guides 199 secured to the frame part 155 of the machine and through thread tension devices 200. The guide and tension device of each set is preferably mounted upon a bracket 201 adjustable transversely of the machine by means of a clamping bolt 202 working in a T-slot 203 formed in the front face of the frame part 155. Thus when the sewing heads and fabric forming devices are adjusted to vary the width of the tubes or plaits, the thread guides and tensioning members may likewise be adjusted. The thread E for each sewing head is passed through an eye 204 formed on the eccentric strap 197 and thence through an eye 205 on the lower end of the needle arm 189. The thread E then passes through a passage 206 formed in the needle arm, see Figure 18, and upwardly through an eye 207 adjacent the point of the needle, see also Figure 18.

The sewing operation will be best understood by reference to Figures 38 to 45 inclusive, wherein the thread T carried by the looper is illustrated by spaced light lines whereas the thread E carried by the needle is indicated by a heavy black line.

Figure 38:
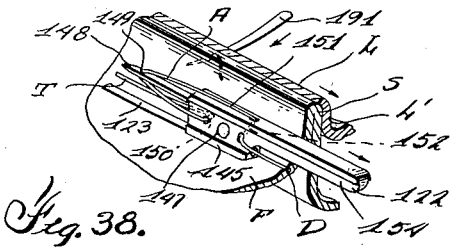
Figure 39:
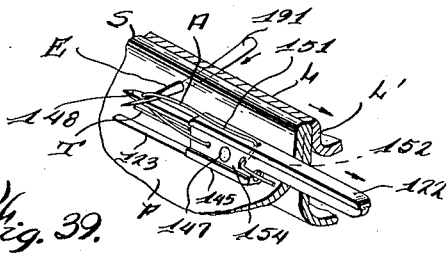
Figure 40:
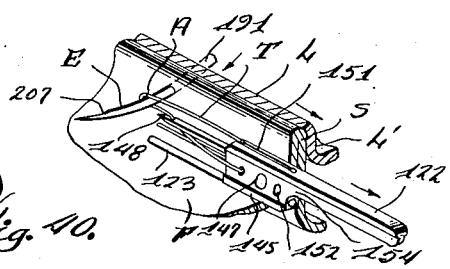

As seen in Figure 38, the looper point 148 of looper 122 is partaking of its return or retracting movement and this retracting movement acts to spread the loop carried by the looper. At the same time the needle 191 is partaking of its forward thrusting movement and as shown in Figure 39, has pierced the tuck or fold S and the adjacent portion L' of the lining fabric L. The point of the needle in Figure 39 has not as yet been rocked downwardly so that its path of travel is above the horizontal plane of the looper end 148. Thus, the needle point passes through the loop carried by the looper and as shown in Figure 40, as the looper continues its retracting movement, the needle continues the thrusting movement so as to slide the loop from the looper well onto the needle.

Figure 41:
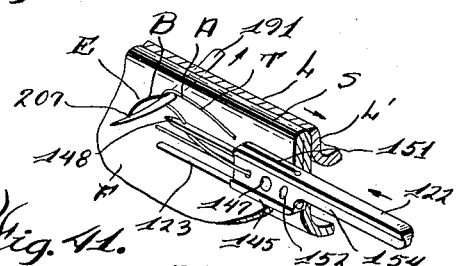
Figure 42:
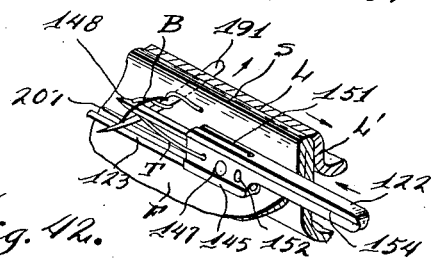
Figure 43:
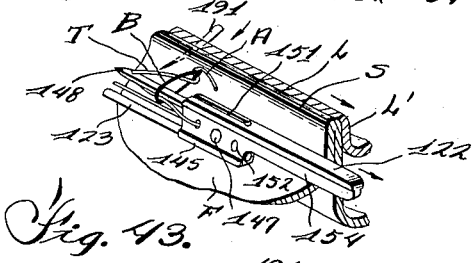
Figure 44:
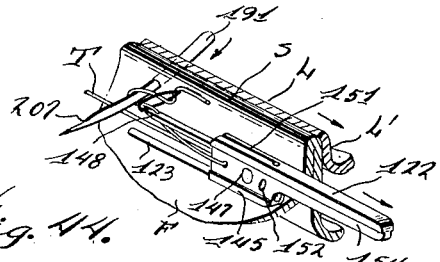

As viewed in Figure 41, the needle 191 has rocked downwardly to spread the loop carried thereby and the looper is commencing its forward or thrusting movement again. By reason of the downward rocking of the needle point, the needle point has moved below the horizontal path of travel of the looper so that the looper point 148 may pass through the needle loop as illustrated in Figure 42. As shown in this figure, the looper is partaking of its thrusting movement while the needle is partaking of its retracting movement to leave the needle loop on the looper point 148. The needle loop is shown as carried completely by the looper point in Figure 43 and the looper is commencing its retracting movement while the needle 191 is again commencing its thrusting movement to enter the fabrics at a point spaced from the point of previous entrance, this being occasioned by reason of the travel of the work in the direction of the arrow ridge.

Figure 45:
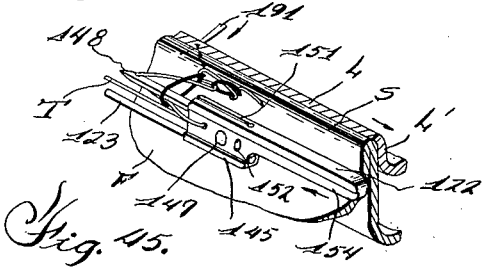

As seen in Figure 44 the needle 191 has again been thrust through the work and has also been thrust through the second loop spread by reason of the retracting movement of the looper. Again the needle point rocks downwardly and the looper moves forwardly to take the next loop from off the needle which as shown in Figure 45 is completely retracted.

This cycle of operations is obviously repeated and as a result the chain lock-stitch such as illustrated in Figure 46 results. The appearance of the stitching on the reverse side of the fabric is illustrated in Figure 47.

From the foregoing it is believed that the manner in which our improved method is executed and the operation of our improved sewing mechanism will be apparent to those skilled in this art. In accordance with our method it is possible to unite finish and lining fabrics to form tubular plaits in such a manner that the seams will be practically invisible on the face of the completed article, the stitches being completed within the tubular plaits. In accordance with this invention the lining or backing material of the completed upholstery may be stretched taut in the subsequent application of the upholstery to seats and the like without imparting any strain or injury to the stitches. The mechanism herein described contemplates automatic means employing a single sewing head and a reciprocating looper for producing stitches of the described character and for forming tubular upholstery with the stitches completed interiorly of the tubes.

While the herein described construction has been found to operate entirely satisfactorily in actual practice, the specific form of construction illustrated is capable of many changes and modifications in the details of construction and arrangements of parts and to this end reservation is made to make such changes in any of the non-essential details as may come within the purview of the accompanying claims.

Certain features of the sewing mechanism above described are not claimed herein, being covered by the claims of a divisional application filed November 9, 1931, Serial No. 574,001.

What we claim as our invention is:

1. Sewing mechanism including, a needle reciprocated in an arcuate path about a center which is shifted on an arc struck from a point in the arcuate path of the needle, and a looper reciprocated on a path which intersects the path of the needle.

2. Sewing mechanism including a needle reciprocated in an arcuate path about a center which is shifted on an arc struck from a point in the arcuate path of the needle, and a looper reciprocated on a path which intersects the path of the needle at right angles thereto.

3. Sewing mechanism including, a needle reciprocated in an arcuate path about a center which is shifted on an arc struck from a point in the arcuate path of the needle to rock the needle to raise and lower the needle point relative to the normal medial line of said arcuate path, and a looper reciprocating in a horizontal plane which intersects said normal medial line.

4. Sewing mechanism including, a needle reciprocated in an arcuate path about a center which is shifted on an arc struck from a point in the arcuate path of the needle to rock the needle to raise and lower the needle point relative to the normal medial line of said arcuate path, and a reciprocating looper moving in a horizontal path which intersects said normal medial line at a substantial right angle.

5. Sewing mechanism including, a needle reciprocated in an arcuate path about a center which is shifted on an arc struck from a point in the arcuate path of the needle to rock the needle to raise and lower the needle point above and below the normal medial line of said arcuate path, and a looper reciprocating in a horizontal plane which intersects said normal medial line.

6. In a sewing mechanism, in combination, a pair of stitch forming members each carrying a thread, means for feeding work past said members, means for reciprocating one of said members through the work, means for reciprocating the other member parallel to the work, and means for rocking one of said members in a direction transverse of the direction of feed of the work.

FREDERICK N. ROSS.
HORACE L. JOHNSON.